April 18, 1967

L. H. BARNETT 3,314,639

MOLD FOR ROTATABLE CASTING

Filed Aug. 19, 1964

INVENTOR.
LOUIS H. BARNETT
BY
Parker & Carter
ATTORNEYS.

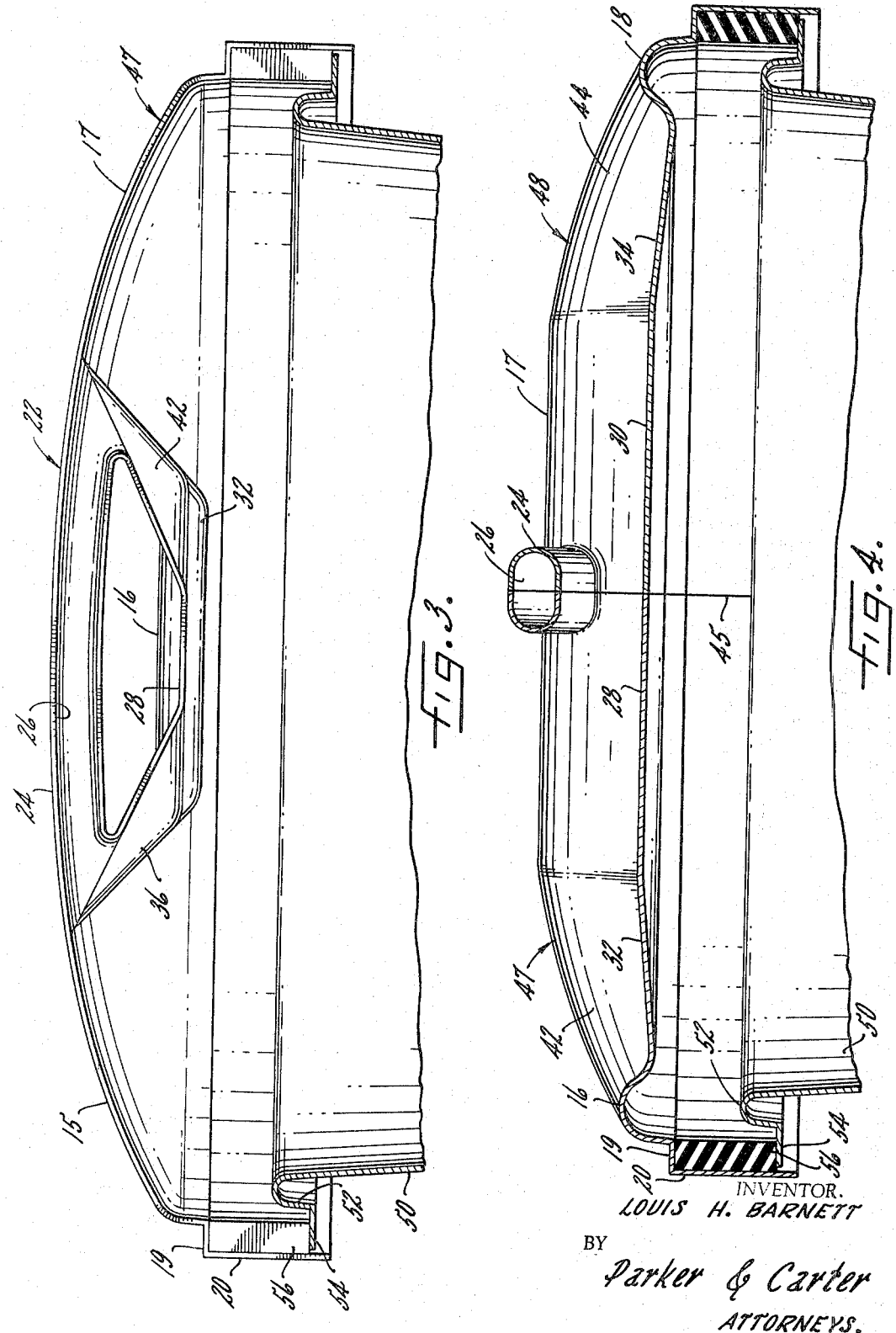

April 18, 1967
L. H. BARNETT
3,314,639
MOLD FOR ROTATABLE CASTING
Filed Aug. 19, 1964
3 Sheets-Sheet 3
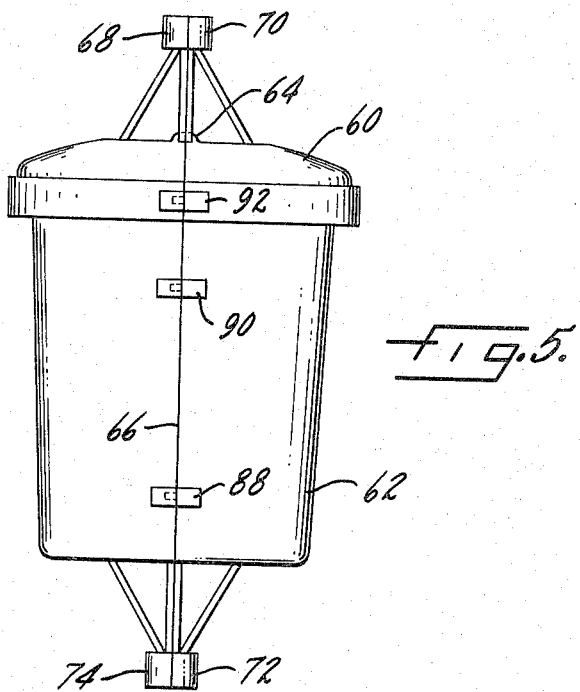
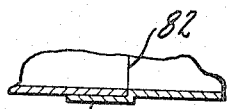
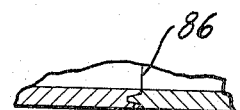
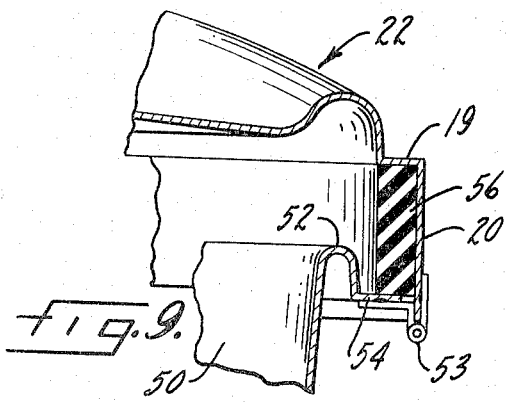
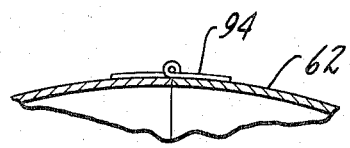
INVENTOR.
LOUIS H. BARNETT
BY Parker & Carter
ATTORNEYS.

United States Patent Office 3,314,639
Patented Apr. 18, 1967

3,314,639
MOLD FOR ROTATABLE CASTING
Louis H. Barnett, Fort Worth, Tex., assignor, by mesne assignments, to Loma Industries, Inc., Cleveland, Ohio, a corporation of Ohio
Filed Aug. 19, 1964, Ser. No. 390,761
11 Claims. (Cl. 249—58)

The instant invention is a continuation-in-part application of my copending patent application Serial No. 347,558, filed February 26, 1964, now abandoned.

This invention relates to a mold for forming plastic articles by rotational casting, and particularly relates to a mold in which a molded part with an integrally formed curved portion is formed and removed at the same time at which the rest of the molded article is formed and removed.

A particular object of this invention is a mold which permits a lid with an integral handle to be formed by rotational casting.

Another object is a mold which permits formation of articles having a shape which would otherwise interfere with simple unidirectional opening of the mold.

Another object is a mold for rotational casting wherein one part of the mold has spaced curves of the type which would normally interfere with simple unidirectional opening of the mold.

Another object is a mold for rotational casting wherein one part of the mold may be opened along a separable line to remove a molded article having spaced curves or shapes which would normally interfere with simple opening of an intact mold part.

Another object is a mold for rotational casting wherein one part of the molded article is formed as a simple open ended container and the other part of the molded article is formed as a substantially flat surface with integrally spaced curves.

Another object is a mold for rotational casting wherein the mold is split substantially along its axial length so that the molded article may be withdrawn by separating the mold along such split line.

Another object is a mold for rotational casting in which the mold has a lid part and a base part and both of these parts are separable along a parting line extending substantially along the axial length of both parts.

Another object is a mold for rotational casting wherein the mold has two parts, one of the parts has spaced curves and both parts are separable along a parting line which extends substantially along the axial length of the mold and along the portion defining the spaced curves.

Another object is a mold for rotational casting wherein one part of the mold has a raised and enclosed passageway connecting with the interior of the mold so that plastic may be deposited in such passageway during rotation, said mold being separable along the axis of said passageway, and the remainder of the mold being separable at a parting line generally aligned with the parting line of the enclosed passageway.

Another object is a mold for rotational casting wherein one part of the mold has a raised and enclosed passageway communicating with the interior of the mold so that the plastic may be deposited in the passageway during rotation of the mold to form a molded part corresponding to the configuration of the enclosed passageway; and said mold being separable along the axis of the enclosed passageway so that the molded article may be removed therefrom.

Such objects are realized along with other objects which will become apparent when considering the invention disclosed in part by the drawing wherein:

FIGURE 3 is a section along line 3, 3 of FIGURE 2, on an enlarged scale;

FIGURE 4 is a section along line 4, 4 of FIGURE 2;

FIGURE 5 is a side elevational view of another embodiment showing the entire mold separable along a parting line;

FIGURES 6 to 8 are partial plan views partly in section of various alignments of the split mold parts;

FIGURE 9 is a partial plan view partly in section of a hinge connection on the lid mold; and FIGURE 10 is a partial side elevational view partly in section showing another hinge connection of the lid mold.

The illustrated mold has two parts, namely, a container mold portion 10, and a lid mold portion 12. A charge of plastic in finely divided or granular form is placed in such a mold, and the molded article may be formed by the well known rotational casting. Generally, in such casting, the mold is rotated, oscillated or rocked along two axes so that the charge of plastic is placed or deposited against all the surfaces within the mold.

Figure 1:
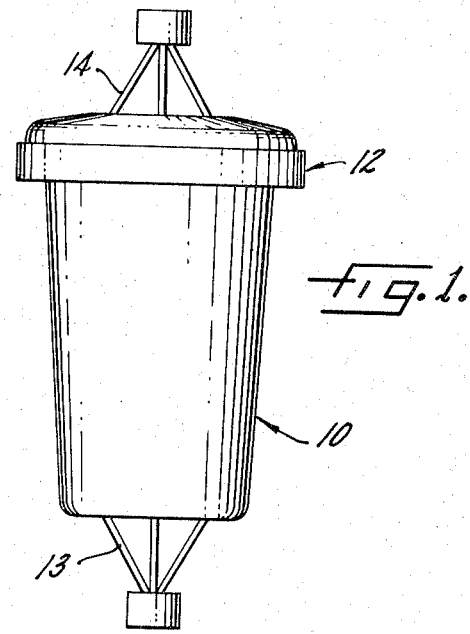
FIGURE 1 is a side elevational view of the mold.

In FIGURE 1, rotational brackets 13 and 14 are indicated for holding the mold in an appropriate apparatus which will rotate the mold along transverse and longitudinal axes. Such brackets are merely illustrative and references may be made to the well known practices of this art for mounting and rotating such molds in appropriate means.

Figure 2:
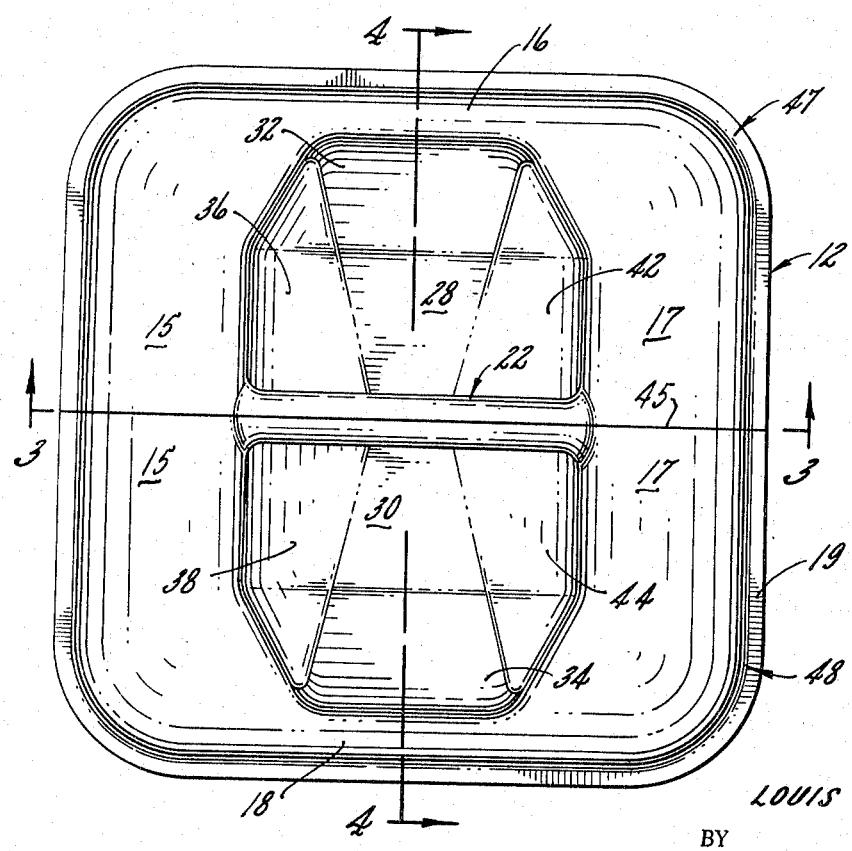
FIGURE 2 is a top plan view on an enlarged scale of the lid mold showing a handle.

The illustrated mold forms containers having lids with curved handle portions. In FIGURE 2, the lid 12 is shown as having a generally rectangular shape with higher raised sides 15 and 17 and lower raised sides 16 and 18. The perimeter of the lid mold is shown with a continuous lowered shoulder 19. An apron extends from the shoulder and extends around the lid. The lid mold is shown as being separated into two portions along a parting line 45 which represents a bisection along the end to end axis of handle 22 into a half mold part 47 and another half mold part 48. The top of the lid mold has a handle mold 22 which includes a continuous wall 24 enclosing passageway 26 communicating with the interior of the mold. Below the handle, the lid mold is shown as lowered to provide room for grasping. The floor of the lower portion is formed by areas 28 and 30 which flank the handle. Adjoining areas 32, 34 drop slightly from flanking floor areas 28 and 30. Alongside higher raised side 15, walls 36 and 38 drop to the areas 28 and 30, and such walls are angled back on each side of parting 45 where the edges of each mold part are separable. Likewise, alongside higher raised side 17, walls 42, 44 drop to the areas 28 and 30 and are angled back on each side of the parting line or edge 45.

The lower container 10 has a side wall 50 which is shown as turned down at the top at 52. A continuous flange 54 extends laterally from the turned down part 52. The lid mold may be joined to the container mold by pivotal means such as a hinge 53 (FIGURE 9). In the embodiment shown, the hinge will be positioned on a side not bisected by parting 45. Thus, the lid mold parts may be separated after the lid mold has been pivoted about the hinge 53.

An annular insulating seal or gasket 56 is shown positioned snugly between shoulders 19 and 20 of the lid and flange 54 of the lower container. The plastic will not set against the seal when the mold is rotated in the oven and, therefore, the lid is molded separately from the lower container in the same operation. This seal is preferably resilient to provide a good fit and prevent leakage of the plastic as the mold is being rotated. The insulating seal may be fixed to shoulder 19 and apron 20 to facilitate mounting of the lid on the lower container. It is preferably made from a material such as a room temperature vulcanizing silicone rubber, a low friction polytetrafluorhydrocarbon such as Teflon or the like. The dried surfaces of the mold may also be coated with such material to facilitate separation of the formed plastic article from the mold.

In FIGURE 5 is shown an embodiment where the entire mold is split along its axial length. The mold includes the lid portion 60 and the base portion 62. The lid portion is shown with the handle mold 64. The entire mold is separable along a parting line 66, which allows the mold to be separated into generally symmetrical halves. Lid supports such as 68, 70 may be provided on the lid 60 to facilitate holding and separating the lid halves along the parting line. A similar set of supports 72 and 74 may be provided on the container to likewise facilitate retention and separation of the container mold along a parting line 66. Grasping tools may be used for holding such supports and separating the mold, or the mold may be manually separated by grasping such supports.

The edges of each mold part along line 45 in FIGURE 2 and line 66 in FIGURE 5 may be fashioned to form different joints such as shown in FIGURES 6 to 8. This may be a butt joint 76 at parting line 78, a lap joint 80 at parting line 82 or a tongue and groove joint 84 along a parting line 86.

The mold parts may be held together to resist early separation during the rotation process. This may be done by providing means such as container mold snap clasps 88 and 90; and lid mold clasp 92. Similar clasps may be positioned along the parting line on the opposite sides of the mold or such opposite side may be hinged as indicated at 94 in FIGURE 10. A cylindrical container mold such as shown in FIGURES 1 and 5 is suitable for such hinged connections because there will be no interference of the mold with the molded article when the mold is opened. Some mold configurations which may cause such interference may be provided with clasps or the like along the parting line at both opposed sides of the mold. Such clasps or retaining means may be used at edges which form an interlock at the parting line such as the lap joint or the tongue and groove, as well as along edges which form a simple butt joint.

The use and operation of my invention are as follows:

A single mold may be used in rotational casting to form separate molded plastic part. Additionally, one of these parts may have shaped portions which would normally interfere with opening the mold in a given direction. Such parts may be said to have spaced curves, by which is meant curved parts which are spaced from the surface or base from which they extend. An example is a lid for a container having a handle whose curved body is spaced from the top of the lid.

A charge of plastic such as polyethylene may be placed in the mold whereupon it is rotated over at least two axes, one transverse to the other. Such rotation is usually done in the oven to solidify the polyethylene which is placed or deposited against all the interior surfaces of the mold during the rotational process. The part of the mold which has been called the lid mold has a handle portion with a passageway enclosed by a continuous wall. During rotation, the plastic will be placed or deposited on the inside surface of this closed wall after it enters the passageway. Following the rotational period and the curing within the oven, a molded article will be formed which corresponds in shape to a lower container and an upper lid with an integrally formed hollow handle.

The lid mold will be moved to open the lower mold container and to separate the molded lid therein. This may be done in various ways, one of which is to vertically lift the lid mold and then horizontally separate the lid mold parts along line 44. Each mold part may likewise be hinged to the lower container, as by joining apron 20 of the lid mold and apron 54 of the lower container with a hinge 53. Each mold part could therefore be opened by swinging the mold parts away from each other along line 44 to free the molded lid with integrally formed handle. The lid mold may also be hinged at just one point so that the lid mold as a whole is raised along the pivoted hinge whereupon the distant part of the mold may be laterally pulled away.

A general advantage is realized by separating the lid mold along a parting line so that articles with spaced grooves may be integrally molded, but an additional advantage may be obtained by providing that the rest of the mold be split or separable along a parting line as indicated in FIGURE 5. The charge of powdered polyethylene, for example, may be placer in the split mold and it may be rotated within an oven by providing rotational brackets such as shown in FIGURE 1 or by positioning such mold in a locking bracket, which locking bracket is otherwise adapted to rotate the mold along two axes. The molded article will be removed following such rotation by separating the entire mold along a parting line such as 66. It is required, of course, that the parting line in the lid portion 60 extend along the long axis of the handle part 64. It is also preferred that this parting line be aligned with the parting line of the container mold 62, but it should be understood that the arrangement may be otherwise. The parting line in the container portion of the mold may be offset relative to the parting line in the lid, and the container part of the mold can then be separated at a time different from separating the lid mold. If the lines are aligned, as preferred, then the entire mold can be separated in one step to remove the molded article. Since the lid part is molded separately from the container part, in the embodiment shown, the lid portion 60 of the mold can be withdrawn and then such lid can be separated along its parting line.

The edges along the parting line are preferably interlocked and retaining means such as clasps and hinges are used to keep the mold parts assembled during the rotational casting. It will be realized that various retaining means can be used such as straps. The interlocking joints could also be provided with small bores to receive locking dowel pins. While single hinge units have been shown, it should be realized that a parting line on one side of the container may be provided with a piano hinge and the other side may have one or more clasps or the like.

The foregoing invention can now be practiced and such practitioners should know that the invention is not necessarily restricted to the particular embodiments presented herein. The scope of the invention is to be defined by the terms of the following claims as given meaning by the preceding description.

I claim:

1. A mold to form containers with removable lids by rotational casting and the like, which includes, in combination, a container mold to form an open mouth container, a lid mold adapted to be placed on the container mold, the lid mold movable to open the container mold, the lid mold having a handle mold with opposed ends joined to the lid mold and communicating with the interior of the container mold, and said mold separable substantially along the end to end axis of the handle mold so that the lid mold may be moved and separated to remove the molded lid with integral handle.

2. A mold as in claim 1 further characterized by and including means between the lid mold and the container mold to enclose the mold and prevent leakage during rotational casting.

3. A mold as in claim 2 further characterized in that the means is an annular gasket around the perimeter of the lid which defines the rim of the molded lid.

4. A mold as in claim 1 further characterized in that the lid mold has a lower floor below the handle portion to provide a space for grasping below the handle in the molded lid.

5. A mold as in claim 1 further characterized by and including pivotal means joining the lid mold so that the lid may be swung away from the container mold following the molding operation.

6. A mold as in claim 1 further characterized by and including edges at the parting line shaped to form an interlock.

7. A mold as in claim 1 further characterized by and including retaining means along the parting line to hold the mold parts together.

8. A mold to form plastic containers with removable lids by rotational casting and the like which includes, in combination, an open ended container portion, a removable lid portion with continuous rim, means to space the rim and fix the lid on the open ended container so that the plastic within the mold is placed against the interior surfaces of the container portion, the lid and the fixing means preventing leakage upon rotation of the mold, an elongated handle portion having a continuous wall enclosing a passageway, the handle joined to the lid portion at opposed ends, the passageway communicating with the interior of the mold, and the lid separable substantially along the end to end axis of the handle portion so that the lid may be moved and separated to remove the molded lid with integrally formed handle.

9. A mold as in claim 8 further characterized in that the continuous rim of the lid is spaced and the lid is fixed to the container portion by a continuous gasket between the lid portion and the container portion.

10. A mold to form plastic containers with removable lids by rotational casting and the like, which includes, in combination an open ended container portion with continuous rim, an annular flange around the open end of the container portion, a continuous gasket positioned between the continuous rim and the annular flange, the gasket spaced from the open end of the container portion so that the molded rim may be formed of a desired thickness, the molded rim dimensioned to adjoin the molded top of the container, a lid mold to be placed on the container portion, a handle portion on the lid mold, the handle portion having a continuous wall enclosing a passageway, the handle joined to the lid mold at opposed ends of the continuous wall so that the passageway communicates with the interior of the mold, and the lid mold separable substantially along the end to end axis of the handle portion so that the lid may be moved and separated to remove the molded lid with the integrally formed handle.

11. A mold to form containers and removable lids by rotational casting and the like which includes, in combination, an open ended container portion, a removable lid portion, an elongated handle portion on the lid portion, said handle having a continuous wall enclosing a passageway, the handle joined to the lid portion at opposed ends, the passageway connected with the interior of the mold, the lid and container separable substantially along an aligned parting line, and said parting line transecting the end to end axis of the handle so that the lid mold may be separated to remove the molded lid and the molded container.

No references cited.

J. SPENCER OVERHOLSER, *Primary Examiner.*

J. H. FLINT, *Assistant Examiner.*